US007049027B2

(12) United States Patent
Buchanan, Jr. et al.

(10) Patent No.: US 7,049,027 B2
(45) Date of Patent: May 23, 2006

(54) SINGLE BATTERY HOUSING ASSEMBLY (75) Inventors: Harrison Lewis Buchanan, Jr., Roanoke, VA (US); Mark Alan Bryant, Troutville, VA (US); Nathan Ray Schlotthober, Roanoke, VA (US); Raymond Aquero, Roanoke, VA (US); Lapthe Chau Flora, Roanoke, VA (US); John Carl Nelson, Salem, VA (US); James Hoge Bowen, Salem, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 460 days.

(21) Appl. No.: 10/359,398

(22) Filed: Feb. 5, 2003

(65) Prior Publication Data
US 2004/0151963 A1    Aug. 5, 2004

(51) Int. Cl.
*H01M 2/10* (2006.01)
(52) U.S. Cl. .................. 429/100; 429/96; 429/123
(58) Field of Classification Search ...................... None
See application file for complete search history.

(56) References Cited

U.S. PATENT DOCUMENTS

| 4,495,257 | A |   | 1/1985  | Engelstein et al. |
|-----------|---|---|---------|-------------------|
| 4,755,725 | A |   | 7/1988  | Kastendieck et al. |
| 4,794,246 | A | * | 12/1988 | Kastendieck .......... 250/214 VT |
| 4,809,942 | A | * | 3/1989  | Kastendieck et al. .. 248/222.13 |
| 4,816,355 | A | * | 3/1989  | Kulibert et al. ............. 429/174 |
| 4,820,031 | A | * | 4/1989  | Kastendieck et al. ....... 313/524 |
| 5,130,527 | A | * | 7/1992  | Gramer et al. ......... 250/214 VT |
| 5,703,354 | A | * | 12/1997 | Wannagot et al. .... 250/214 VT |
| 5,827,619 | A |   | 10/1998 | Iida |
| 5,943,174 | A |   | 8/1999  | Bryant et al. ................ 359/809 |
| 6,071,639 | A |   | 6/2000  | Bryant et al. .................. 429/97 |
| 6,087,660 | A |   | 7/2000  | Morris et al. ............... 250/330 |

FOREIGN PATENT DOCUMENTS

EP        0 642 151 A        3/1995

OTHER PUBLICATIONS

Patent Abstract of Japanese Publication No. 2003142047.
G. Walker, Eyes In the Dark Night Vision in a New Light, Jul., 1989, pp. 54, 56-61.
Illes P. Csorba, Image Tubes, 1985, Howard W. Sams & Co, Inc., A Publishing Subsidiary of ITT, pp. 21-27 and 131.
FJW Optical Systems, Inc., Find-R-Scope, Part No. 84499 and sheet discussing sensitivity, components, operation, specifications, warranty Feb. 7, 1996, 2 pages.
FJW Optical Systems, Inc., Find-R-Scope and Accessories Price List, Jul. 4, 1990, 2 pages.
FJW Industries, End Cap Assy C Cell Batteries, Aug. 15, 1988, the Fine-R-Scope Drawing, 1 page.
Department of the Army, Metascope Assembly, Image, Infrared, Transistorized, Jul., 1962, FSN 1090-790-6197, pp. 1-100.
Gene Adcock, Electro-Optical Surveillance, 1999, CCS Security Publishing, Ltd. Glossary-23 and 27, pp. 1-3 through 1-5, 1-13, 1-15 through 1-19, 1-41, 1-44, Fig. 1-31, 4-1, 4-6, 5-1, 5-3 through 5-11.

* cited by examiner

Primary Examiner—Michael Barr
Assistant Examiner—Karie O'Neill
(74) Attorney, Agent, or Firm—RatnerPrestia (57) ABSTRACT A battery housing for use with a night vision device. The housing is arranged to carry a single, easily replaceable battery and is carried by an electronic device such as a night vision device.

13 Claims, 9 Drawing Sheets

SINGLE BATTERY HOUSING ASSEMBLY

TECHNICAL FIELD

This invention relates to battery containers in general. More particularly, it relates to a battery holder for holding a single battery used to power an electronic device, such as a monocular night vision device.

BACKGROUND OF THE INVENTION

Many electrical devices require one or more batteries to operate. One such electrical device is a monocular night vision device which allows military and law enforcement personnel to conduct operations in low light or at night.

A conventional monocular night vision device uses a dual battery housing assembly to energize an image intensifier and an electronics assembly including a printed circuit board and flex circuitry. The conventional dual battery housing assembly provides a battery compartment, holds the electronics, and connects the battery and the electronics to the remainder of the system. Conventional dual battery housing assemblies require two 1.5 volt direct current AA batteries to operate. Together, the two batteries provide the 2 to 3 volts that are needed to energize an image tube in the night vision device. However, operating a system with two batteries instead of one battery increases the size of the battery housing assembly and the weight of the system. The extra weight of a second battery can become a large factor when the system is worn in a head mount or with a helmet mount for hands-free viewing. The two battery system also has greater visual obstruction inhibiting peripheral vision around the system.

In addition, instead of using fie batteries until the lives of the batteries have been depleted, many users insert new batteries into the monocular night vision device before the beginning of each mission to ensure the user will not have to replace batteries during a mission. When a user replaces batteries before they have been depleted, twice as many batteries are used than if the monocular night vision device required only a single battery.

Furthermore, the conventional monocular night vision device design uses a battery cartridge that is designed for use with a side-by-side dual battery compartment. Such a battery cartridge is not as easy to operate as a screw-on-cap designed for use with a single battery compartment. For example, the dual battery cartridge uses release levers that can be inadvertently activated causing the battery cartridge to disengage from The battery housing during operation. Accordingly, the battery cartridge tends not to be robust enough to endure the rugged environment required in military and law enforcement operations.

In addition, the distance between the battery cartridge and the variable gain knob assembly on the conventional dual battery housing is very limited, being as close as 0.030 in. In order to compensate for size increases of the battery cartridge, the diameter of the variable gain knob assembly has been made smaller than desired making it difficult for some users to operate the knob, especially when wearing gloves.

The conventional dual battery cartridge is coupled to the rest of the system via a neck lanyard which can cause difficulty in inserting the battery cartridge into the battery housing since the neck lanyard can get in the way during insertion of the battery cartridge.

To overcome the shortcomings of a dual battery housing, a new single battery housing is provided. An object of the present invention is to provide an improved battery housing for a monocular night vision device that is smaller in size, lighter in weight, and easier to use than the dual battery housing. A related object is to provide more space between the battery cap and the variable gain knob assembly so that it is easier to turn either knob. Another object is to make it easier to replace the single battery in the battery housing.

SUMMARY OF THE INVENTION

To achieve these and other objects and in view of its purposes, the present invention provides a battery housing for use with a night vision device and configured to contain a battery and a circuit board and being further configured to cooperate with fasteners for removably securing the housing to the night vision device. The housing comprises a battery holder for retaining a single battery and configured to be carried in the housing. The battery holder is operatively associated with electrical contacts for connecting the battery in an electrical circuit.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity Included in the drawings are the following figures:

FIGS. 9A, 9B, 9C provide an exploded view showing an exemplary embodiment of an interrelationship between the battery sleeve assembly and the overmolding.

DETAILED DESCRIPTION OF THE INVENTION

An exemplary embodiment of the single battery housing assembly of this invention requires only a single AA battery for operation. It will be understood by those skilled in the art that a battery with a different name, or a plurality of ocher batteries, may be used if their power, space, weight, and terminal configuration fit into the housing and are sufficient to energize an attached device. The battery housing assembly may include a voltage step-up circuit which may increase the 1.5 volt AA battery up to at least two volts which may provide sufficient power to operate an image intensifier. The housing assembly is designed in a way that makes it compact, rugged, ergonomically improved, and also provides an environmental seal and EMI shielding. Tile battery housing assembly may provide reverse polarity protection and the capability to maintain electrical contact with the battery during system shock, such as when it is mourned on a weapon and the weapon is fired.

A battery cap also improves ease of use, ruggedness, and ergonomic design. The design of the battery cavity, the battery's contacts, and the contacts in the battery cavity may also provide reverse polarity protection in the event the battery, or batteries, are inserted incorrectly. The position of the battery cavity may also provide greater clearance between the battery cap assembly and the variable gain knob assembly. In an exemplary embodiment, the distance between the battery cap assembly and tile variable gain knob assembly may increase by four or five times over the prior art. Therefore, a larger diameter variable gain knob assembly than the conventional variable gain knob assembly may be incorporated into the housing assembly. The battery cap assembly may be retained to the system by a cable attached to a top post on the battery cap and to one of the posts of the battery housing. This retention method may reduce interference between the battery cap and the battery housing during attachment of the battery cap.

Figure 1:
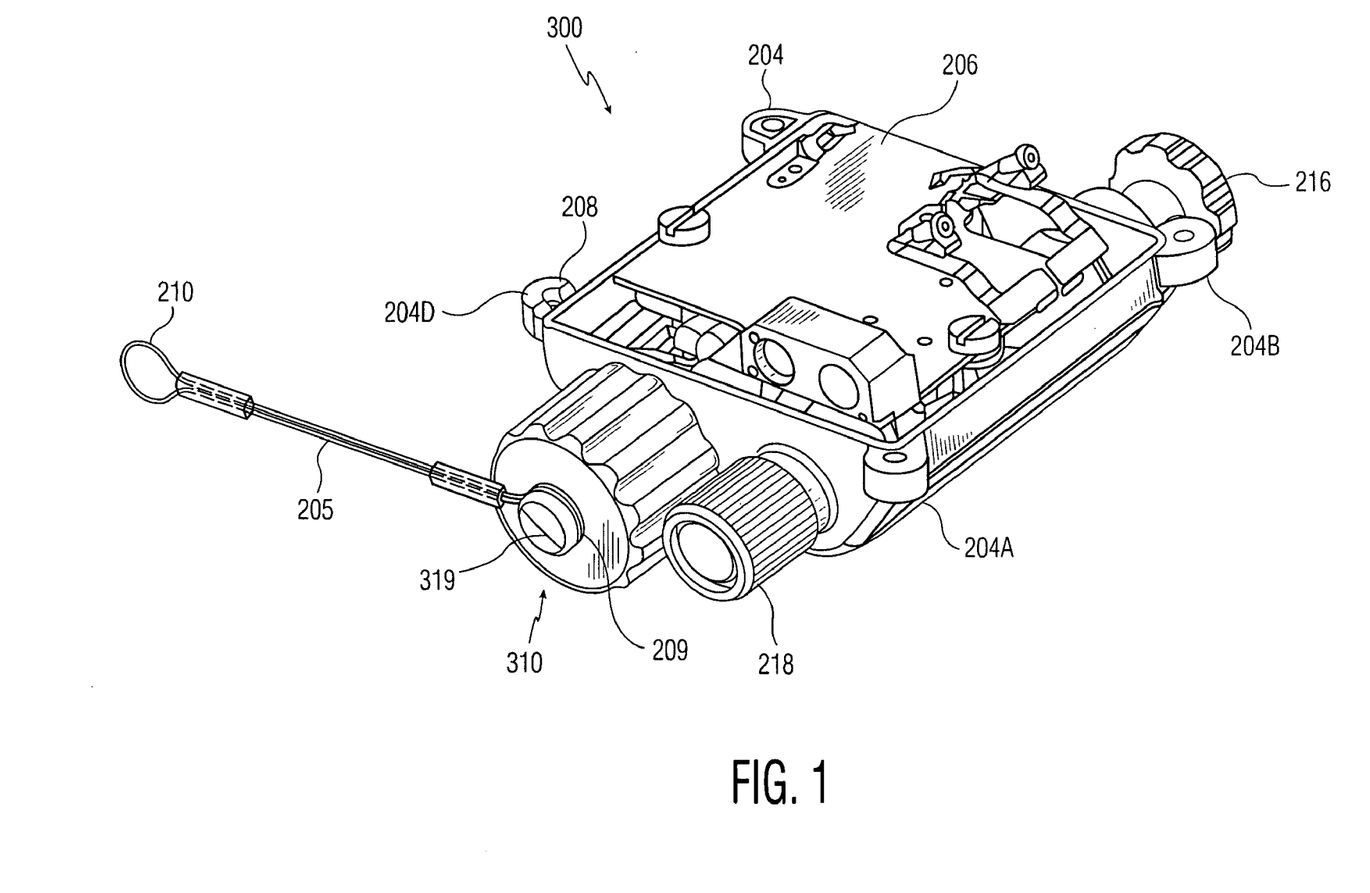
FIG. 1 is a bottom perspective view of an exemplary embodiment of the single battery housing assembly of the invention.

Referring now to the drawings, in which like reference numbers refer to like elements throughout the various figures that comprise the drawings, FIG. 1 shows an exemplary embodiment of the single battery housing assembly 300. Single battery housing assembly 300 includes an on/off switch 216, electronics assembly 206, and a battery cap assembly 310. Fastener posts 204A, 204B, 204C, 204D enable the single battery housing assembly to be connected to a monocular housing assembly. Since the dimensions of the mating surfaces of the single battery housing assembly 300 may be the same dimensions as the conventional battery housing, single battery housing assembly 300 may be attached to the monocular housing assembly in the same manner as the dual battery housing assembly and the monocular housing assembly may not have to be redesigned.

Figure 2:
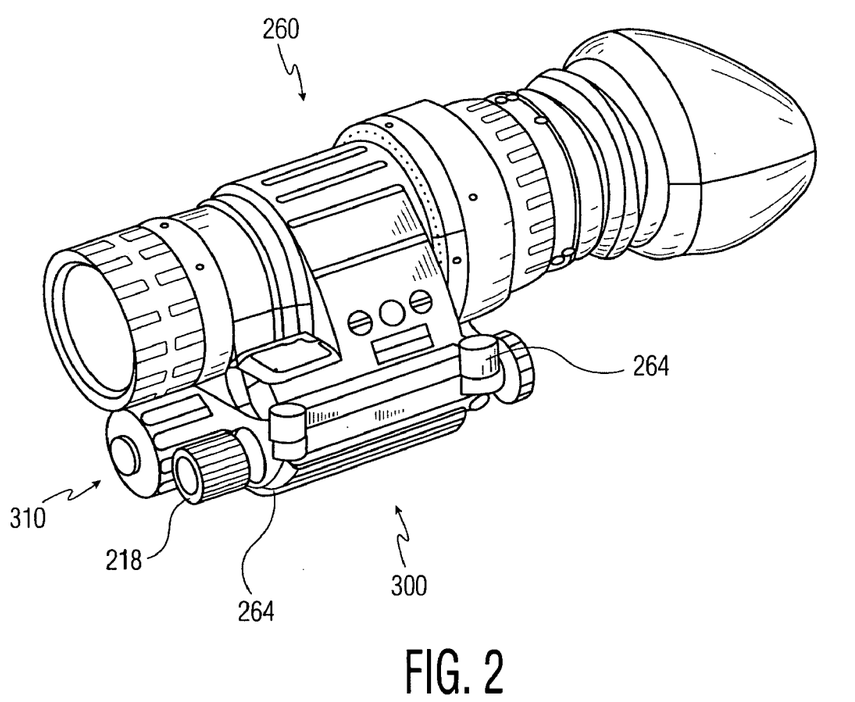
FIG. 2 is an assembled view of an exemplary embodiment of the single battery housing assembly of the invention with die monocular housing assembly, showing; them coupled to each other.

Referring to FIG. 2, monocular housing assembly 260 has four fastener posts 264, two of which are shown. Single battery housing assembly 300 may be fastened to monocular housing assembly 260 using four fasteners for joining fastener posts 204A, 204B, 204C, 204D with fastener posts 264 FIG. 2 shows the two units fastened together. FIG. 1 shows a lanyard 205 coupled to a lanyard retention post 319. Lanyard 205 has loops 209 and 210 at respective ends. Loop 209 may be placed under post 319. A portion of the lanyard between loops 209 and 210 may be placed in groove 208 of post 204D. When monocular housing assembly 260 is connected to single battery housing assembly 300 with fasteners in posts 204A, 204B, 204C, 204D, and 264, lanyard 205 may be clamped into groove 208. When battery cap assembly 310 is removed, lanyard 205 and battery cap assembly 310 may not be misplaced because lanyard 205 is captured by groove 208.

Figure 3:
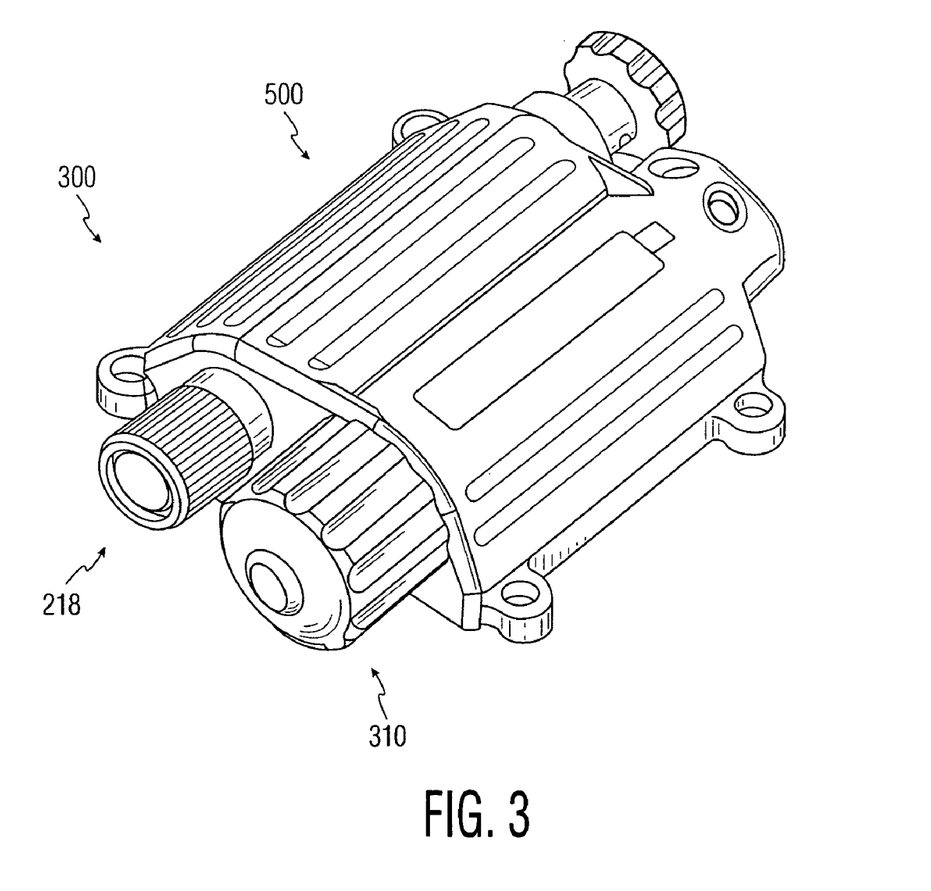
FIG. 3 is a top isometric view of an exemplary embodiment of the single battery housing/sleeve assembly of the invention.

Referring to FIGS. 1 and 3 the single battery housing assembly 300 includes a battery housing/sleeve assembly 500, electronics assembly 206 which includes a printed circuit board assembly and a flex circuit, the battery cap assembly 310, the switch knob assembly 216, and the variable gain knob assembly 218. The printed circuit board assembly in the electronics assembly may incorporate a step-up converter (not shown) which may increase the voltage provided by a single 1.5 volt AA battery to at least two volts in order to energize an image intensifier (not shown) in the monocular housing assembly.

Figure 4:
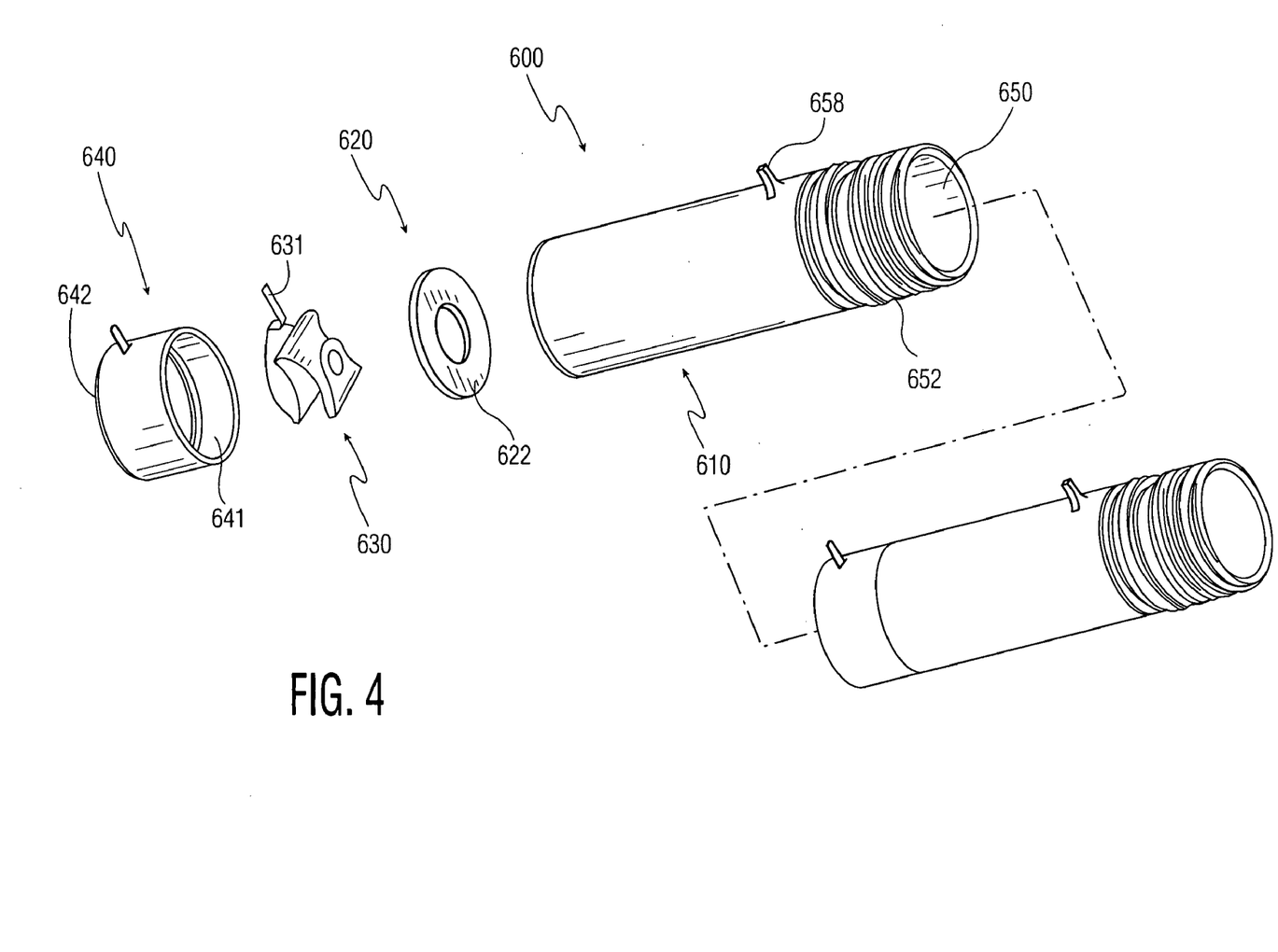
FIG. 4 is an exploded view of an exemplary embodiment of the battery sleeve assembly of the invention.
Figure 5:
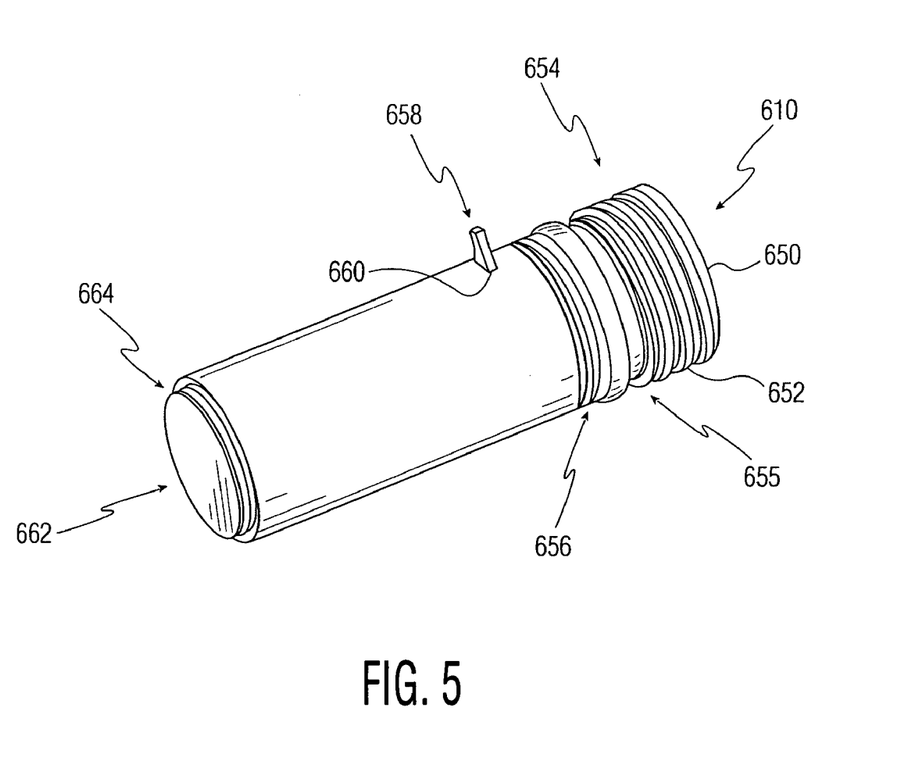
FIG. 5 is a perspective view of an exemplary embodiment of the battery sleeve of the invention.

FIG. 4 shows an exploded view of a battery sleeve assembly 600 which includes a battery sleeve 610, an insulating washer 620, a leaf spring 630, and an end portion spring insulator 640. Battery sleeve 610 is also shown in FIG. 5. Battery sleeve 610 is a hollow cylinder made of a conducting material. In an exemplary embodiment, the inside length and diameter of battery sleeve 610 may be sufficient to envelop a single AA battery, In an alternative embodiment, the internal dimensions of battery sleeve 610 may be sufficient to envelop any battery that may provide sufficient voltage and power to energize a monocular night vision device or other device. In an exemplary embodiment, the conducting material may be a conducting plastic. In an alternative embodiment, the conducting material may be a conducting metal. An example of a conducting metal may be 7075 aluminum or any other metal or material which is able to withstand high temperatures (for example, temperatures in excess of 400 degrees Farenheit) and high pressure.

Referring to FIGS. 4 and 5, battery sleeve 610 has an open end 650. In an exemplary embodiment, open end 650 may be the top end of battery sleeve 610. In an alternative embodiment, open end 650 may be the bottom end of the battery sleeve. Battery sleeve 610 may be a single conducting cylinder that is machined into multiple segments. Segment 652, which may comprise about 10% of the total length of battery sleeve 610, is externally threaded and forms open end 650. In an exemplary embodiment, the external threads may be stub acme threads which have the advantages of easy start and quick installing without galling or cross-threading. In an alternative embodiment, other thread typos may be used. The external threads of segment 652 interface with internal threads on battery cap assembly 310 as shown below. Immediately adjacent to segment 652 may be an o-ring groove 655. O-ring groove 655 may not be manufactured as part of battery sleeve 610, but may, instead, be a separate item that is placed around battery sleeve 610 during the manufacturing process. When battery cap assembly 310 threads onto the external threads of segment 652, battery cap assembly 310 may extend over segment 652 and interface with o-ring groove 655 to form an environmental seal which may prevent the battery housing assembly from being impacted by weather conditions) any type of moisture including salt water, sand, and dust.

Adjacent to the o-ring 655 groove may be a series of grooves which provide additional environmental seating when an overmold process (described later) has been completed. These grooves may be filled in during the overmolding process described below to help ensure that the battery sleeve assembly 600 will remain securely positioned within the battery housing assembly 300 and may not be pulled out of the battery housing assembly.

A negative connector 658 projects outwardly from the outer surface of battery sleeve 610. Negative connector 658 may provide an electrical connection between a flex circuit and a negative terminal of a battery. In an exemplary embodiment, negative connector 658 may be an integral part of battery sleeve 610. That is, both the negative connector 658 and the battery sleeve 610 may be manufactured from a single piece of material. Negative connector 658 may project at an angle with respect to the longitudinal axis of sleeve 610. In an exemplary embodiment, negative connector 658 may project at an angle that is substantially perpendicular to the longitudinal axis of battery sleeve 610. In an alternative embodiment, it may project at an angle that is not substantially perpendicular to the longitudinal axis of battery sleeve 610.

At the bottom end of negative connector 658 where it projects from battery sleeve 610, a support of additional material 660 is machined to provide support for negative connector 658 and to protect negative connector 658 from breaking off from battery sleeve 610. In an exemplary embodiment, support 660 is part of the same single rod or sheet of material from which battery sleeve 610 and negative connector 658 are made. Support 660 is integral with the bottom end of negative connector 650 and integral with the outer surface of battery sleeve 610. The bottom of negative connector 658 makes physical and electrical contact with battery sleeve 610. The top of negative connector 658 may make physical and electrical contact with the flex circuit assembly. The mass of negative connector 659 may be minimized so that it is easier to solder the top of negative connector to tie flex circuit. In an alternative embodiment, negative connector 658 may be made in a variety of shapes such as a modified rectangle or cylinder. The most appropriate shape may be selected which may provide the best physical and electrical connection between the flex circuit assembly and the battery sleeve 610.

The other end 662 of battery sleeve 610 is also an open end. In an exemplary embodiment, end 662 may be the bottom of battery sleeve 610. In an alternative embodiment, end 662 may be the top of battery sleeve 610. Bottom end 662 has a snap feature 664 formed with a rib which is known to those skilled in the art. The outside diameter of snap feature 664 is less than the outer diameter of the main body of battery sleeve 610. In an exemplary embodiment, the inside diameter of end 662 is the same as the inside diameter of the main body of battery sleeve 610. The smaller outside diameter snap feature 664 at the bottom of battery sleeve 610 may snap the battery sleeve 610 into the spring insulator 640 and may serve as an upper stop for insulating washer 620.

After the battery sleeve 610 is formed, it may be covered with gold plate to enhance the solderability of negative connector 658. The gold plating may also provide corrosion resistance. Tie gold placing may cover the entire battery sleeve as well as negative connector 658. In an alternative embodiment, tin plating may be used to cover the negative connector 658 instead of gold plating. If battery sleeve 610 is made from aluminum, and if the exterior is covered with gold plating in order to enhance solderability and corrosion resistance, then a pre-coating such as nickel may be applied to battery sleeve 610 before the gold exterior plating is applied. In an alternative embodiment in which tin plating is applied to negative connector 658, a nickel pre-coating may also be applied to negative connector 658 before applying the exterior coating of tin plating.

Figure 6:
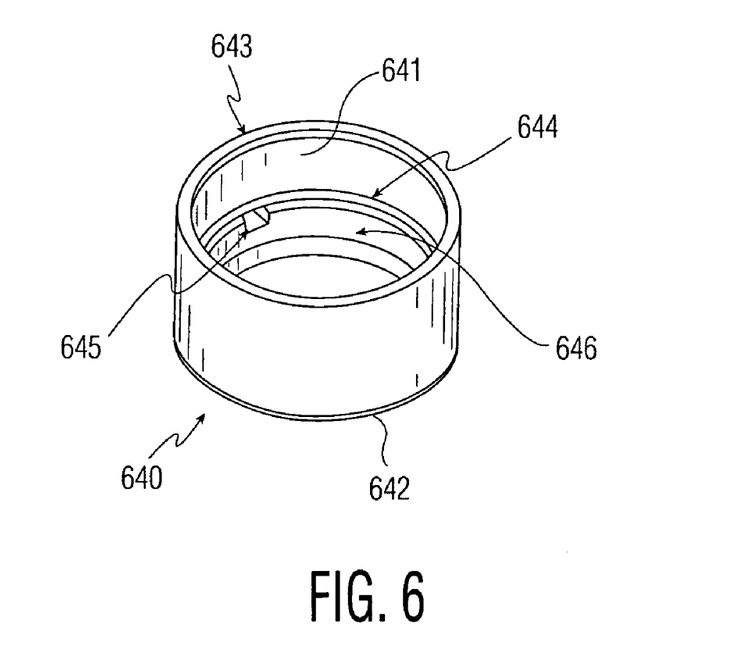
FIG. 6 is a perspective view of an exemplary embodiment of the spring insulator of the invention.

Referring to FIGS. 4 and 6, a spring insulator 640 may form an end portion of battery sleeve assembly 600 when it is coupled to battery sleeve 610. Spring insulator 640 may be made from high temperature insulating material; that is, material that may withstand high temperatures in the 400–500 degree Farenheit range and that is not electrically conducting. In an exemplary embodiment, spring insulator 640 may be made from unfilled plastic. In an alternative embodiment, it may be made from bard coated 7075 aluminum. Spring insulator 640 is cylindrically shaped and is hollow. It is open at end 641 and closed at end 642. The outer diameter of spring insulator 640 nay be the same as the outer diameter of battery sleeve 610. Spring insulator 640 may have inside diameters that are smaller than the inside diameter of battery sleeve 610. One smaller inside diameter 643 may form the mating part for the snap feature 664 at the bottom of battery sleeve 610. The mating part 643 of the snap feature is well known to those skilled in the art. Another smaller inside diameter 644 may form a lower stop for insulating washer 620 and may also form part of the lower stop mechanism for battery sleeve 610. In an alternative embodiment, bonding may be used instead of the snap feature.

Two features may be formed beneath lower stop 644. One feature may be a through hole 645 in the side wall of spring insulator 640 to allow a tab 631 on leaf spring 630 to be inserted through the side wall. Another feature may be gripping features 646 that may be etched into the inside wall of spring insulator 640 during the manufacturing of spring insulator 640. Gripping features 646 in spring insulator 640 may mate with gripping features 632 of leaf spring 630 (shown in FIG. 7) in a manner that is well known to those skilled in the art.

Figure 7:
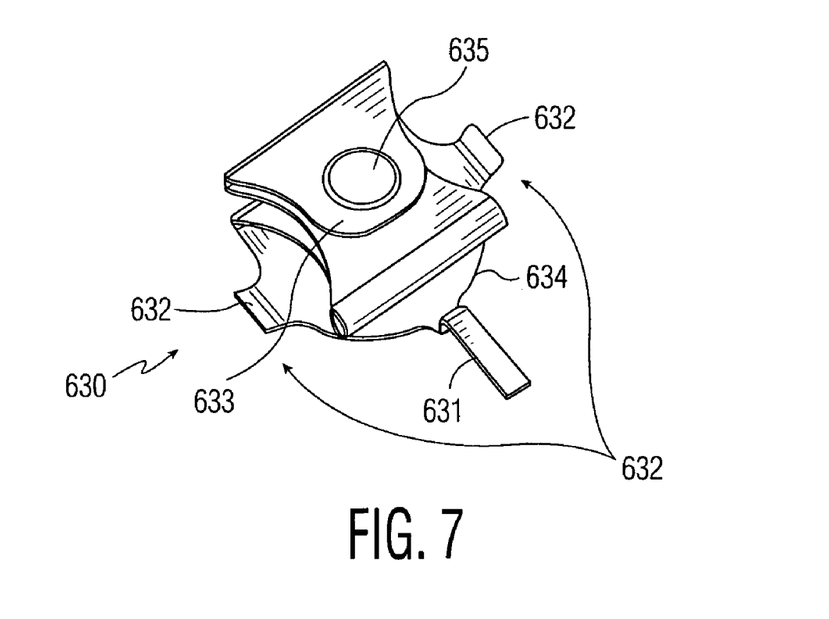
FIG. 7 is a top isometric view of an exemplary embodiment of the leaf spring of the invention.

Leaf spring 630 is shown in FIGS. 4 and 7. In an exemplary embodiment, leaf spring 630 may be made from a flexible, electrically conducting material such as BeCu alloy. In an alternative embodiment, it may be made from any other metal or metal alloy that can be easily molded into the needed shape, will hold its shape against compression forces, is very conductive, and operates well when exposed to varying temperatures and environmental conditions, including exposure to chemicals. In another alternative embodiment, a coil spring may be used instead of a leaf spring.

Leaf spring 630 may be formed as a Z-shape that zigzags back and forth a number of times The multiple bends may provide a compressible distance to stabilize the battery when the weapon is fired. That is, the height of leaf spring 630 may be compressed when its top layer 633 is compressed toward its bottom layer 634. Leaf spring 630 has multiple bends and the necessary material strength so that it may limit the distance it compresses. Limiting the distance of leaf compression may limit the distance of battery movement and provide stability to the battery. In an exemplary embodiment, leaf spring may be compressed so that the distance from top layer 633 to bottom layer 634 may vary from each other in the range of 0.1 inch to 0.3 inch.

A dome interface 635 may be located on the top layer 633 of leaf spring 630. Dome interface 635 may help to ensure proper contact with the positive end of the battery through a hole 622 in insulating washer 620.

Leaf spring 630 may also have a gripping feature 632 on opposite sides of lower leaf 634. Gripping features 632 may be part of the single piece of metal from which leaf spring 630 is made so that gripping features 632 may be part of an integral, unitary leaf spring. In an alternative embodiment, gripping features 632 may be manufactured separately and then attached to leaf spring 630 by any means that is known to those skilled in the art Gripping features 632 may allow leaf spring to be press fitted into spring insulator 640 during the assembly of battery housing assembly 600. When gripping features 632 are press fit into spring insulator 640, they come into contact with gripping features 646 in spring, insulator 640 in order to reduce movement between leaf spring 630 and spring insulator 640 as well as to reduce movement between leaf spring 630 and the remainder of the battery assembly housing. The angle of gripping features is chosen so that a good grip is attained with spring insulator 640. If the angle is not large enough, it may be difficult to push leaf spring 630 into spring insulator 640. If the angle is too large, the grips may not fit tightly enough against gripping feature 646, thereby preventing a tight enough coupling between leaf spring 630 and spring insulator 640.

Another part of leaf spring 630 is connection tab 631 which may extend from die tip of lower leaf 634. Connection tab 631 may be part of the single piece of material from which leaf spring 630 is made so that tab 631 may be part of an integral, unitary leaf spring. In an alternative embodiment, connection tab 631 may be manufactured separately and then attached to leaf spring 630 by any means that is known to those skilled in the art. Connection tab 631 may be inserted through hole 645 in the side wall of spring insulator 640 so that it may provide an electrical connection between a flex circuit assembly and the positive terminal of a battery.

Referring to FIG. 4, an insulating washer 620 may be placed inside spring insulator 640 so that it is between leaf spring 630 and battery sleeve 610. The outside diameter of insulating washer 620 may be the same as the inside diameter of open end 641 of spring insulator 640 and greater than the inside diameter of lower stop 644 of spring insulator 640 so that when insulating washer 620 is inserted into spring insulator 640, it may be stopped by lower stop 644. Hole 622 in the middle of insulating washer 620 may have a diameter that is large enough to allow the tip of the battery to contact dome 635 of leaf spring 630.

Insulating washer 620, in combination with dome 635 of leaf spring 630, may provide reverse polarity protection. In an exemplary embodiment, a single AA battery may be inserted into the battery assembly housing to energize the monocular right vision device. One end of a AA battery (or other battery) has a tip which provides a positive voltage. The other end of a AA battery is flat and provides a negative voltage. In an exemplary embodiment, the positive tip end of a battery may be inserted into the battery housing assembly in the direction of insulating washer 620.

When a battery is inserted correctly into battery housing assembly 300, the diameter of the tip of the battery providing positive voltage is small enough so that it may fit through hole 622 in insulating washer 620 and contact dome 635 of leaf spring 630. On the other hand, the diameter of the flat, negative end of the battery is larger than tie diameter of hole 622 of insulating washer 620. If the negative terminal of a battery is inserted into battery housing assembly 600 toward insulating washer 620, hole 622 is not large enough to allow the flat, negative end of the battery to contact dome 635 of leaf spring 630. Consequently, when the battery is inserted incorrectly, insulating washer 620 prevents the battery from contacting dome 635.

In an exemplary embodiment, the battery housing assembly and the monocular night vision device may be coupled to a weapon such as a rifle. When the weapon is fired, the force of the projectile ejecting in a forward direction may drive the rifle in a backward direction. Since the battery housing assembly and the monocular night vision device may be coupled to the weapon, they may also be driven in a backward direction. The backward movement of the entire weapon/battery housing assembly/monocular night vision device may be abruptly stopped by the shoulder of the person holding tie weapon or by some other fixed object. Although the backward movement of the weapon and its attached components will abruptly stop, the inertia of the battery may cause it to continue moving backward inside the battery assembly housing. If the battery were to move too far, it may lose physical and electrical contact with dome 635 of leaf spring 630, thereby breaking the electrical circuit connection between the battery and the monocular night vision device, thereby rendering inoperable the monocular night vision device.

The height and strength of leaf spring 630 is one part of the battery assembly housing that may limit the distance the battery moves after the weapon stops moving. Another part of the battery assembly housing that may stabilize the battery by limiting the movement of the battery is insulating washer 620 which may be seated against lower stop 644 in spring insulator 640. Insulating washer 620 may be thick enough so that it may also protect leaf spring 630 from being compressed too much thereby preventing it from being compressed beyond the point where it may not return to its full expanded width. It may also be thick enough so that the thickness is larger than the thickest positive contact of a AA battery, Insulating washer 620 may also be able to travel upward and downward between lower stop 644 and snap feature 643 of battery sleeve 610. This freedom to move between lower stop 644 and snap feature 643 may enable the battery assembly to accommodate batteries of different lengths, maintain contact with the battery during times of battery movement, and prevent the leaf spring from being overly compressed.

Figure 8:
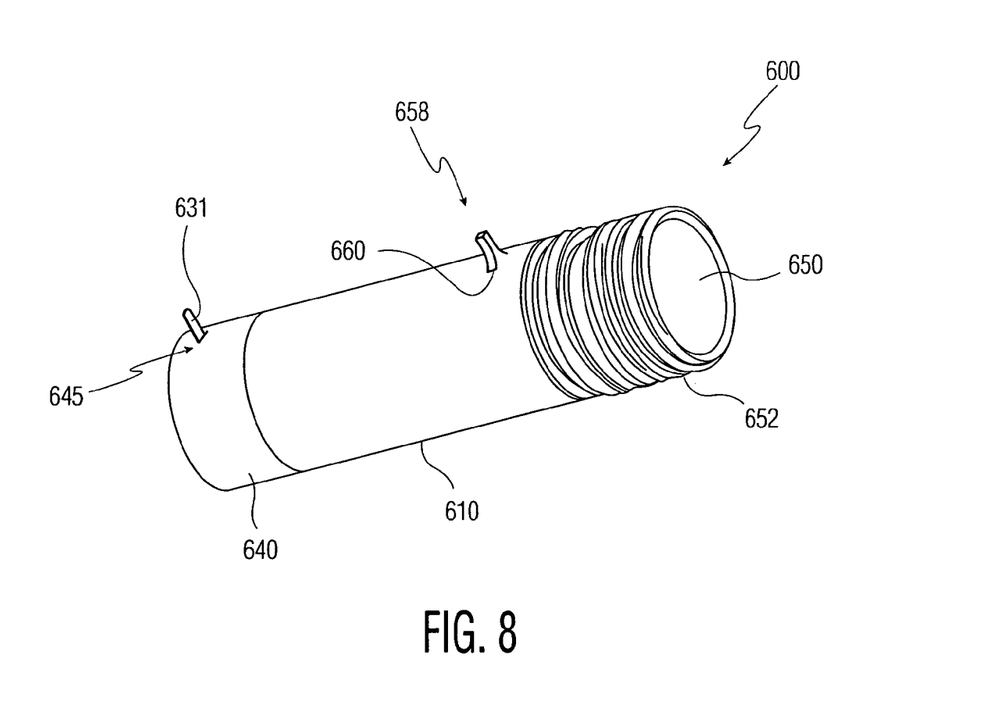
FIG. 8 is a perspective assembled view of an exemplary embodiment of the battery sleeve assembly of the invention showing the positive and negative connectors.

FIG. 8 shows an assembled battery sleeve assembly 600. When the components of the battery sleeve assembly are assembled, positive connector 631 of leaf spring 630 protrudes from spring insulator 640 through hole 645 and negative connector projects from the outer surface of battery sleeve 610. Negative connector 658 and positive connector 631 may make appropriate connections with the flex circuit of the monocular night vision device and with the negative and positive terminals of a battery inside the battery assembly. Positive connector 631 and negative connector 658 may be aligned so that they connect to the flex circuit. In an exemplary embodiment, positive connector 631 and negative connector 658 may be aligned parallel to the longitudinal axis of battery assembly housing 600. In an alternative embodiment, the connectors may be aligned in a way that is not parallel lo the longitudinal axis of the battery assembly housing. In an exemplary embodiment, the alignment may be done manually. In an alternative embodiment, tooling or robotics may be used to align the connectors.

Figure 9A:
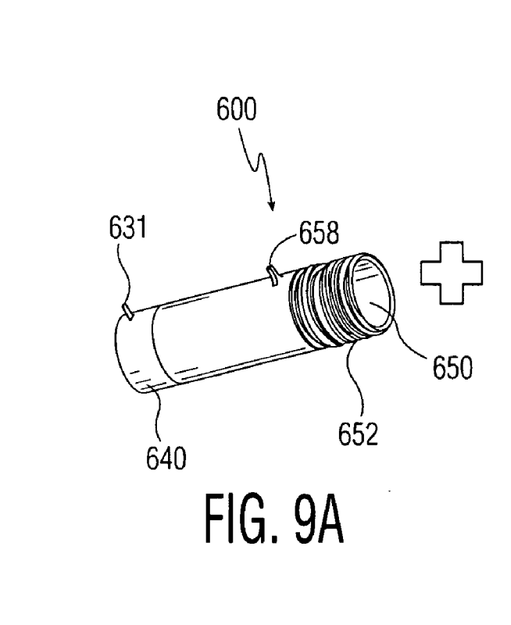
FIG. 9A is a perspective view of an exemplary embodiment of the battery sleeve assembly.
Figure 9B:
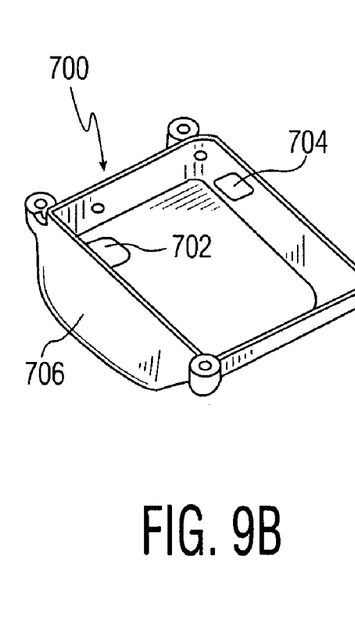
FIG. 9B is a perspective view of an exemplary embodiment of overmolding for the battery sleeve assembly.
Figure 9C:
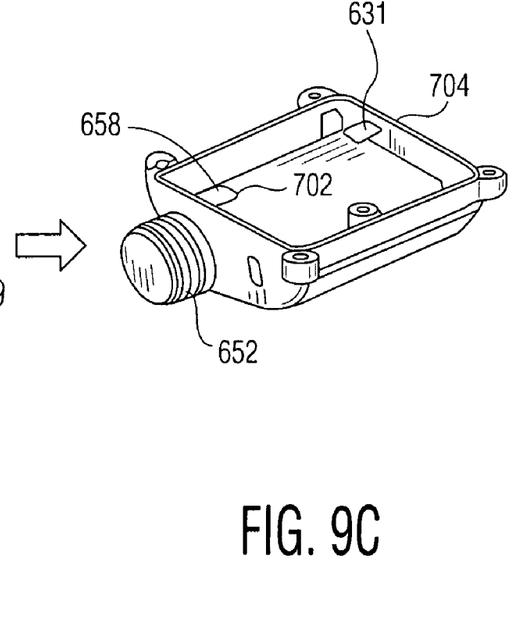
FIG. 9C is a perspective view showing the battery sleeve assembly inside the overmolding.

Referring to FIGS. 9A, 9B, and 9C, once the battery sleeve assembly 600 is assembled, it may be inserted into an injection mold tool which creates battery housing 700 around the assembly by an overmolding process. During the overmolding process, a liquid, high temperature, conductive plastic flows into the injection mold tooling, wraps around the battery sleeve assembly, and fills all voids in the injection mold tooling cavity, including grooves 656 shown in FIG. 5.

In an exemplary embodiment, the conductive plastic of battery housing 700 may be a carbon filled nylon or polyethermide (PEI) which melts at a temperature around 400 or 500 degrees. One brand of such a product is ULTEM™. In an alternative embodiment, the conductive plastic may be nickel coated, carbon filled nylon. In another embodiment, the conductive plastic may be any plastic containing carbon fibers or other fill fibers that conduct electricity. In yet another alternative embodiment, another conductive plastic may be used which provides a snug molded fit around the battery sleeve assembly to provide environmental protection, ruggedness, and resistance to chemical attack. When the housing 700 is made from conductive plastic, it may provide a shield that may protect the monocular night vision device from electromagnetic energy emanating from radio equipment and radar equipment and also protect from electrostatic discharge associated with static electricity. In addition, battery housing 700 may protect radar equipment and radio equipment from electromagnetic energy that may emanate from the monocular night vision device. During the overmold process, the plastic is molded around the battery sleeve assembly in a way that is known to those skilled in the art.

At the conclusion of the mold-around process, battery sleeve assembly housing 600 is inside battery housing 700 to form the battery housing/sleeve assembly 500. At the completion of the mold-around process, end 650 and segment 652 of battery sleeve assembly 600 protrudes from opening 706 (see FIGS. 9B and 19C) in battery housing 700 and end portion 640 is inside battery housing 700 and cannot be seen outside the battery housing. The inside of battery housing 700 may have two breakthroughs 702, 704 so that positive connector 631 may protrude from breakthrough 704 and negative connector 658 may protrude from breakthrough 702. The protruding connectors are shown in FIG. 9C. After the overmolding process has been completed, a separate adhesive seal may be applied around positive connector 631 or around negative connector 658. The adhesive seal creates an environmental seal between spring insulator 640 and positive connector 631. The breakthrough 704 formed around positive contact 631 during the overmolding process may simplify the seal application.

Figure 10:
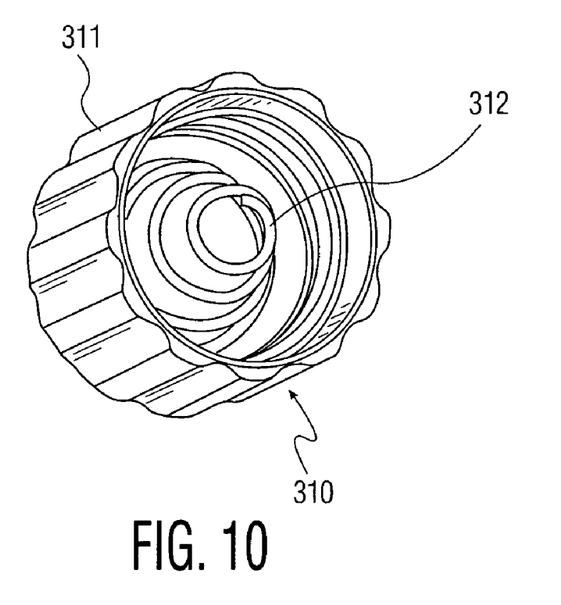
FIG. 10 is an assembled view of an exemplary embodiment of the battery cap assembly of the invention comprising the battery cap and the soil spring.

Referring to FIGS. 1–3, the battery housing/sleeve assembly 500 may be completed by adding battery cap assembly 310 as a cover for segment 652 of the battery sleeve assembly. Referring to FIG. 10, battery cap assembly 310 includes a battery cap 311 and a coil spring 312 which fits inside battery cap 311. Battery cap 311 and coil spring 312 are both made of a conductive material. The inside diameter of battery cap 311 may be large enough to fit over segment 652 of battery sleeve assembly 600. The inside of battery cap 311 may include a threaded interface 315 which may provide an interface with the external threads 654 on segment 652 of battery sleeve 610. The inside of battery cap 311 may also include a smooth diameter interface 313 which interfaces with the O-ring assembly 655 on battery sleeve 610. Coil spring 312 may be snapped into the inside of battery cap 311 at an undercut groove 314 inside battery cap 311.

Figure 11:
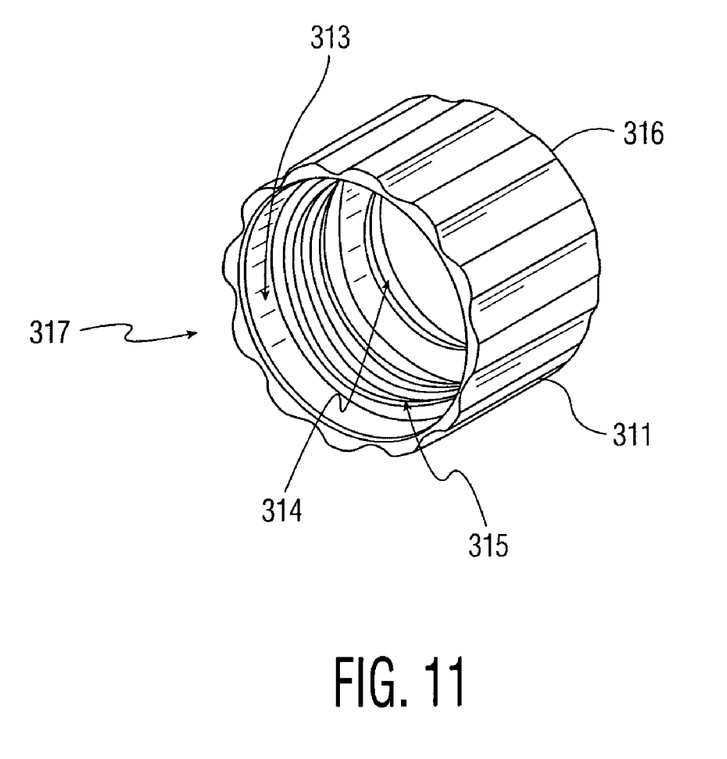
FIG. 11 is a perspective view of an exemplary embodiment of the inside of the battery cap of the invention.

O-ring interface 313, undercut groove 314, and threaded interface 315 are all placed at different locations inside battery cap 311. O-ring interface 313 may be placed close to open end 317 of battery cap 311. Undercut groove 314 may be placed near closed end 316 of battery cap 311. Threaded interface 315 may be placed between o-ring interface 313 and undercut groove 314. In an exemplary embodiment, coil spring 312 may comprise 5½ coils which, in their uncompressed state, may be 0.56 inches high and, in their compressed state, may be 0.150 inches high. In an alternative embodiment, a different number of coils may be used having different uncompressed and compressed dimensions, as long as the coils provide sufficient pressure on the battery to limit its movement within the battery assembly housing. Coil spring 312 may be assembled to battery cap 331 by snapping the largest diameter coil into undercut groove 314 on the inside of battery cap 311. When battery cap assembly 310 threads onto the battery sleeve, the threads inside the battery cap engage the threads on the battery sleeve assembly and the smooth inside diameter 313 slides over the top of the battery assembly until it mates with the o-ring groove 655 on the battery assembly and creates a environmental seal. The seal may keep out any type of moisture including salt water, sand and dust.

When battery cap assembly 310 is fully engaged with the battery sleeve assembly, coil 312 may press against the negative terminal of a battery inside the battery sleeve assembly providing additional stability to the battery when the weapon is fired. Both coil spring 312 and leaf spring 630 provide battery stability.

In operation of an exemplary embodiment, when a AA battery is inserted into battery sleeve assembly 600, its positive terminal may face toward positive connector 631. Since battery sleeve assembly 600, battery cap assembly 310, and negative connector 658 are all made from conducting material, the negative charge from the negative terminal may travel through battery cap assembly 310 through battery sleeve assembly 600, through negative connector 658, and into a flex circuit assembly. The positive charge from the positive terminal of the battery may travel from the positive terminal of a battery to dome 635 of leaf spring 630, to positive connector 631, and into a flex circuit assembly.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A battery housing for use with a night vision device, the housing being configured to contain a battery and a circuit board, the housing being further configured to cooperate with fasteners for removably securing the housing to the night vision device and comprising:
    a battery holder for retaining a single battery and configured to be carried in the housing, the battery holder being operatively associated with electrical contacts for connecting the battery in an electrical circuit and including a sleeve member, wherein the sleeve member is electronically conductive, the housing is conductive, and the electrical contacts include
    a first conductor electrically connected to the sleeve member for electrical connection to a first terminal of the battery, the first conductor outwardly projecting from an outer surface of the sleeve and protruding through a first opening in the housing, and
    a second conductor for electrical connection to a second terminal of the battery, the second conductor protruding through an opening in an end portion of the sleeve and protruding through a second opening in the housing.

2. The battery housing in accordance with claim 1, wherein a cap is removably carried by the sleeve member, the cap being located on the outside of the sleeve and providing access to the interior of the sleeve when the cap is removed from the sleeve member.

3. A battery housing in accordance with claim 1, further comprising a step-up arrangement for increasing the voltage of the single battery.

4. The battery housing in accordance with claim 1, wherein the first conductor is integral with the sleeve and further comprising a support for the first conductor, the support being integral with an end of the first conductor and with the outer surface of the sleeve.

5. The battery housing in accordance with claim 1, further comprising:
- a first spring for electrical coupling to the first terminal of the battery, and
- a second spring for electrical coupling to the second terminal of the battery, said second spring being inside the end portion of the sleeve and integral with the second conductor.

6. The battery housing in accordance with claim 5, further comprising:
- a spacer, inside the end portion of the sleeve, between the second spring and the second terminal of the battery for providing reverse polarity protection for the battery and for stabilizing the battery; and
- a stop inside the cap for limiting movement of the spacer and the battery.

7. The battery housing in accordance with claim 5, wherein an inner surface of the cap has a groove to receive the first spring, threads to provide an interface with a first segment of an outer surface of the sleeve member, and an area to provide an interface for a second segment of the outer surface of the sleeve member.

8. A battery housing comprising:
- a sleeve for receiving a battery, the sleeve having an outer surface;
- a first conductor for electrical connection to a first terminal of the battery, the first conductor being integral with the sleeve and projecting outwardly from the outer surface of the sleeve at an angle with respect to an axis of the sleeve; and
- a second conductor projecting from an end portion of the sleeve for electrical connection to a second terminal of the battery.

9. The battery housing of claim 8, further comprising
- a first spring for electrically coupling to the first terminal of the battery;
- a second spring for electrical coupling to the second terminal of due battery, said second spring being inside the end portion of the sleeve and integral with the second conductor;
- a spacer, inside the end portion of the sleeve, between the second spring and the second terminal of the battery for providing reverse polarity protection for the battery and for stabilizing the battery; and
- a stop inside the end portion of the sleeve for limiting movement of the spacer and the battery.

10. The battery housing of claim 8, wherein the end portion of the sleeve is a first end portion, and further comprising a second end portion of the sleeve and threads on a portion of an outer surface of the second end portion.

11. The battery housing of claim 10, further comprising:
- a cover coupled to the second end portion of the sleeve, an inner surface of the cover having
- a groove to receive the first spring,
- other threads to provide an interface with the threads on the outer surface of the sleeve, and
- an area to provide an interface with another portion of the outer surface of the sleeve.

12. A battery housing comprising:
- an electrically conductive sleeve for receiving a battery;
- an electrically conductive housing for receiving the sleeve;
- a first conductor electrically connected to the sleeve for electrical connection to a first terminal of the battery and to electric circuitry, the first conductor outwardly projecting from an outer surface of the sleeve and protruding through a first opening in the housing; and
- a second conductor for electrical connection to a second terminal of the battery and to the electric circuit, the second conductor protruding through an opening in an end portion of the sleeve and protruding through a second opening in the housing.

13. The battery housing of claim 12, wherein a portion of the sleeve protrudes from the housing, and further comprising a cover coupled to the portion of the sleeve protruding from the housing.

* * * * *